United States Patent [19]
Mentink et al.

[11] Patent Number: 5,934,176
[45] Date of Patent: Aug. 10, 1999

[54] HYDRAULIC OPERATING SYSTEM

[75] Inventors: Laurentius A. G. Mentink, Haaksbergen; Roelof Jan Wind, Almelo, both of Netherlands

[73] Assignee: Applied Power Inc., Butler, Wis.

[21] Appl. No.: 08/903,533

[22] Filed: Jul. 30, 1997

Related U.S. Application Data

[63] Continuation of application No. PCT/NL96/00047, Jan. 30, 1996, abandoned.

[30] Foreign Application Priority Data

Feb. 1, 1995 [NL] Netherlands ............... 9500181

[51] Int. Cl.$^6$ ..................................... F15B 21/02
[52] U.S. Cl. ..................................... 97/37; 60/368
[58] Field of Search ............... 91/469, 459, 465, 91/361, 362, 37; 60/368, 406, 459, 403, 477; 296/223

[56] References Cited

U.S. PATENT DOCUMENTS

| | | | |
|---|---|---|---|
| 3,908,515 | 9/1975 | Johnson | 91/420 |
| 4,416,187 | 11/1983 | Nystrom | 91/361 |
| 4,773,302 | 9/1988 | Mizota et al. | 91/361 |
| 5,170,021 | 12/1992 | Martini | 187/110 |
| 5,375,418 | 12/1994 | Shelhart et al. | 60/394 |
| 5,454,292 | 10/1995 | Oudelaar | 91/446 |

FOREIGN PATENT DOCUMENTS

WO/94/29137  12/1994  WIPO.

OTHER PUBLICATIONS

Applicant's Exhibit A—Patent Cooperation Treaty Report Concerning Novelty Search of International Type for Netherland Application No. 9500181, dated Feb. 1, 1995.
Applicant's Exhibit B—English translation of Applicant's Exhibit A.
Applicant's Exhibit C—Patent Cooperation Treaty International Search Report for International Application No. PCT/NL96/00047, dated May 15, 1996.

*Primary Examiner*—F. Daniel Lopez
*Attorney, Agent, or Firm*—Quarles & Brady

[57] ABSTRACT

A hydraulic operating system has a cylinder which is actuated to raise, hold or lower a load against the force of gravity. An electromagnetic 3/2 valve connects a working chamber of the cylinder to a hydraulic reservoir when not energized, and permits flow from a pump to the working chamber when energized. A non-return valve prevents flow from the working chamber to the pump when the valve is energized. A three position switch operates an electric control unit to raise, lower or hold the load in an intermediate position. When holding in an intermediate position, the control unit constantly energizes the valve during a first period, after which the control unit intermittently energizes and deenergizes the valve so as to lower the load in stepwise fashion during a second period.

3 Claims, 1 Drawing Sheet

HYDRAULIC OPERATING SYSTEM

This is a continuation of International Application Number PCT/NL96/00047 filed Jan. 30, 1996 designating the United States, now abandoned respecting the United States.

FIELD OF THE INVENTION

The invention relates to a hydraulic operating system comprising a hydraulic cylinder which moves a load connected to the piston thereof against the force of gravity, in particular said load is a part of a foldable roof of a vehicle.

BACKGROUND OF THE INVENTION

The German Offenlegungsschrift DE 38 26 789 discloses a hydraulic operating system comprising several hydraulic cylinders which serve to move various parts of the foldable roof of a vehicle and are controlled by means of electromagnetically operated spring-return 3/2-control valves. In the fully opened and the fully closed position of the foldable roof these control valves are not energized, so that the hydraulic system is pressureless.

In order to make it possible to hold the foldable roof in an intermediate position, which position lies between the fully opened and the fully closed position of the foldable roof, the known system provides for a "holding condition", in which a downward movement of parts of the foldable roof under the influence of gravity is prevented. In this position the pump of the hydraulic system is switched off, and a "holding function" is obtained by maintaining energization of the electromagnetic control valves belonging to the working chambers of the cylinders which produce a movement of one or more parts of the foldable roof against the force of gravity. In the case of the known system a non-return valve placed between such a working chamber and the pump prevents hydraulic fluid from flowing out of the working chamber concerned, with the result that the parts of the foldable roof operated by the cylinder concerned are held in place in a stationary position.

The drawback of the known system is that the electromagnetic control valves used for these systems may be energized continuously only for a limited period, because otherwise the electrical part of these control valves can become damaged through overheating. That is why it is proposed in the abovementioned publication that the control unit should be provided with a time switch which stops energization after a specific period has elapsed. The result of this is that the part of the foldable roof which has been "held" by the control valve concerned until then will begin to move under the influence of gravity. This downward movement can be slowed down in a known manner by taking additional measures such as placing a throttle element in the line to the reservoir or by incorporating other decelerating systems, such as friction couplings, in the foldable roof mechanism. In the case of some roofs of stiff fabric material the downward movement is slowed down to some extent by the resistance of the fabric to folding. However, in the case of foldable roofs with relatively heavy and rigid roof parts in particular, the downward movement will be very rapid unless it is deliberately slowed down. This can lead to injury to the passengers in the vehicle, or in any case to a shock reaction.

SUMMARY OF THE INVENTION

The object of the present invention is to propose measures which make it possible in a simple manner to end the holding function of the hydraulic operating system safely, in particular without adaptation of the hydraulic set-up of the known hydraulic operating system.

This object is achieved by providing a hydraulic operating system. In this operating system the electric control unit is designed such that in the condition of the control element for holding the load in an intermediate position said control unit supplies a signal to the electromagnetic control valve during a first period, by means of which the control valve is constantly energized during this first period, and in a subsequent, second period supplies a signal to the electromagnetic control valve, by means of which the control valve is intermittently energized and not energized such that the load which is movable by the hydraulic piston-cylinder unit executes a downward movement under the influence of gravity in a stepwise manner during the second period.

In the system described in DE 38 26 789 the measure according to the present invention can be achieved by adapting the program stored in the microprocessor of the control unit. In particular, it is advantageous that the hydraulic set-up need not undergo any change in order to realize the inventive idea.

The first period, in which the control valve concerned remains energized continuously, can be selected for so long that the holding function need not be broken off for a duration which is considered normal in practice for said holding function. During the second period, the period of time during which the control valve concerned is not energized in each case can be selected in such a way that a stepwise, and in particular slow downward movement of the load occurs.

In the application of the invention as a hydraulic operating system for a foldable roof of a vehicle, an improved safety is provided for the passengers and any bystanders. In particular, it is found that, due to the inertia of the parts of such a foldable roof, it is hardly noticeable that the downward movement is taking place in a stepwise manner.

Another advantage of the invention is that the battery of the vehicle, which supplies the energy for keeping the control valve energized, can be saved, since the holding function can now be completed safely.

DETAIL DESCRIPTION OF A PREFERRED EMBODIMENT OF THE INVENTION

Figure 1:
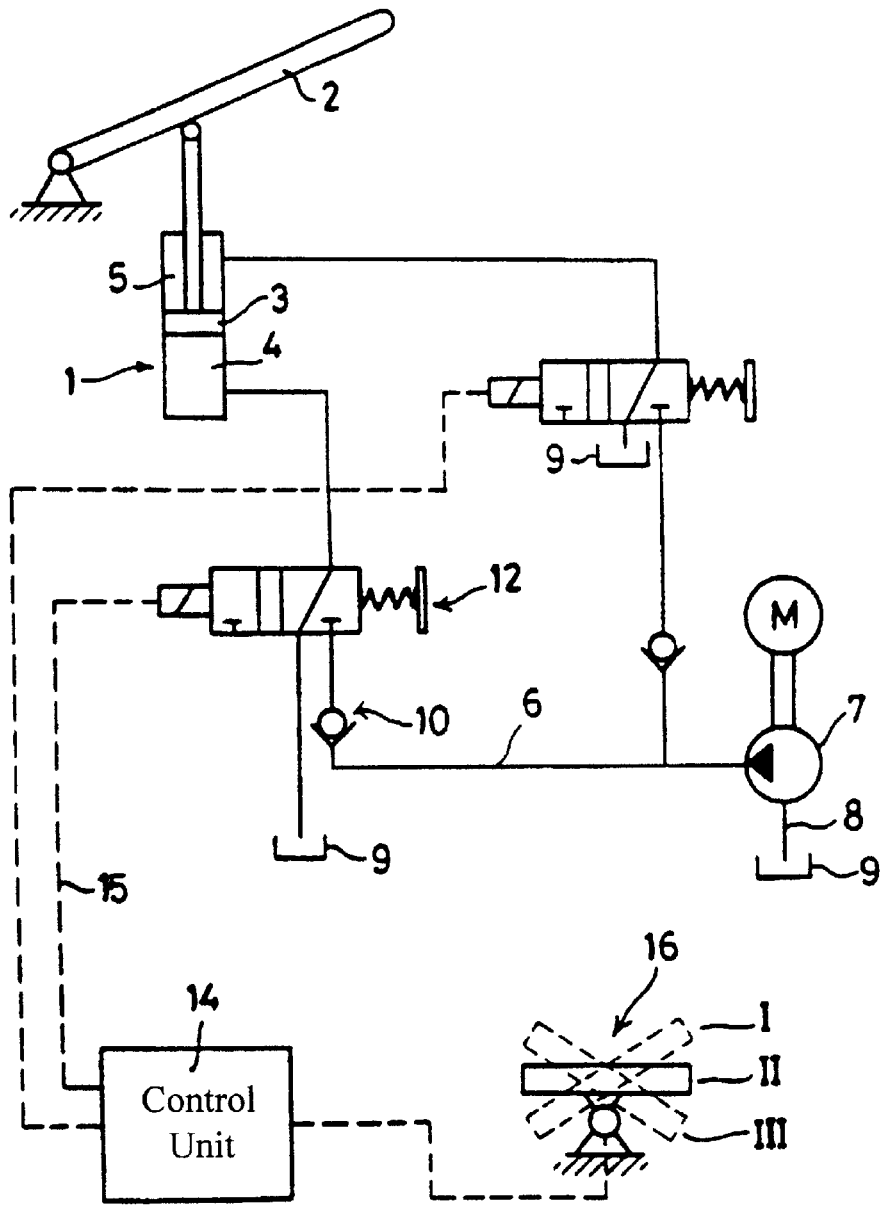
FIG. 1 is a schematic view of a preferred embodiment of a hydraulic operating system for opening and closing a foldable roof of a vehicle.

The invention will now be explained in greater detail with reference to the drawings.

A double-acting hydraulic cylinder 1 serves to open and close cover 2 of a foldable roof (not shown) of a motor vehicle. Such a cover 2 is generally used for covering the opened-up roof, which is accommodated in a compartment at the back of the car. Piston 3 of the cylinder 1 forms a first working chamber 4 and a second working chamber 5 with variable volume in the cylinder 1. As can be seen clearly, supplying hydraulic fluid to the first working chamber 4 leads to the cover 2 moving upwards. The first working chamber 4 is connected by a fluid line 6 to a pump 7. The pump 7 can suck in hydraulic fluid by way of fluid line 8 from a pressureless reservoir 9 and supply it to the first working chamber 4.

The fluid line 6 contains a non-return valve 10, which prevents flow from the first working chamber 4 to the pump 7, but allows it to pass in the opposite direction. An electromagnetically operated 3/2-valve 12 with a spring return mechanism is accommodated in the fluid line 6 between the non-return valve 10 and the connection to the first working chamber 4. The valve 12 is driven by an electric control unit 14, which is connected by a signal line 15 to the valve 12.

The control unit 14 comprises a control button 16, which can be operated by the driver of the motor vehicle. The button 16 has three positions, indicated with I, II and III. So long as the driver holds the button 16 in position I, the control unit 14 makes the foldable roof of the car open, and in position III makes it close. When the button 16 is released, it assumes position II. If the button 16 is in position II and the foldable roof is not in the fully opened or the fully closed position, the control unit 14 produces a "holding function". This means that, for example, when the cover 2 is in the position shown in the drawing, hydraulic fluid is prevented from flowing out of the first working chamber 4 into the reservoir 9 and the cover 2 is prevented from folding down unimpeded under the influence of its own weight. For this purpose, the control unit 14 according to the invention is designed in such a way that while the holding function is switched on for a first period, which can be for a number of minutes in practice, the valve 12 is kept energized. The non-return valve 10 prevents hydraulic fluid from flowing out of the working chamber 4, with the result that the cover 2 is held up.

In a variant which is not shown the non-return function can be integrated in the valve 12, so that it is possible to dispense with the non-return valve 10 placed separately in the line 6.

Figure 2:
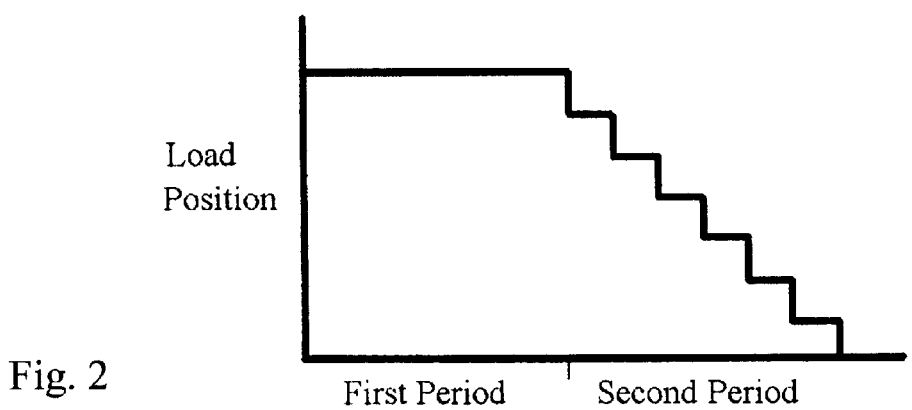
FIG. 2 is a graph showing the movement of a load during first and second periods in accordance with the invention.

As already stated, the electromagnetically operated valves used in this field do not permit unlimited energization, because overheating can then occur. The present invention therefore ensures that before any overheating can occur, the continuous energization during the first period is followed by an intermittent energization for a second period (FIG. 2). In said second period the signal delivered by the control unit 14 by the line 15 to the valve 12 is such that the valve 12 is alternately energized and not energized. The result of this is that during each phase of the valve 12 not being energized hydraulic fluid can flow out of the working chamber 4 into the reservoir 9. The cover 2 will consequently move downwards in a stepwise manner under the influence of its own weight. Through a suitable selection of the duration of being energized and not energized, the downward movement can be given any desired course. For instance, the movement can be slow at first and can speed up slightly on approaching the end position. Determining the desired movement course is very simple if the control unit comprises a microprocessor, because all that is then necessary is the input of a suitable program. The duration of the second period is preferably chosen to be so long that the cover can reach its end position from each initial position.

It is obvious that the holding function described here with reference to the cover 2 can also be achieved for other parts of a foldable roof unit, such as for a rear cover part of the foldable roof or for a cover which covers a compartment of the vehicle wherein the foldable roof is stored in the fully opened position. The present invention also relates to other applications wherein a load is moved by a hydraulic cylinder and which load has to be held by said cylinder against gravity.

What is claimed is:

1. A hydraulic operating system, comprising a hydraulic cylinder having a piston which bounds a working chamber in said cylinder, said cylinder being arranged to move a load connected thereto against the force of gravity when hydraulic fluid is fed to said working chamber, said operating system further comprising a pump and a reservoir for hydraulic fluid, said pump being placed in a fluid line between said reservoir and said working chamber for supplying hydraulic fluid to said working chamber, wherein in said fluid line between said pump and said working chamber a valve element with a non-return function, which blocks flow in the direction from said working chamber towards said pump, and an electromagnetically operated control valve are accommodated, which control valve when not energized connects said working chamber to said reservoir, and when energized connects said working chamber to said pump, said operating system also comprising an electric control unit, which is connected through a signal line to said electromagnetic control valve, which control unit has a control element with a raising, a lowering, and a holding condition for raising, lowering and holding in an intermediate position said load respectively, while for holding said load in said intermediate position said electromagnetic control valve is energized, whereby said valve element with non-return function prevents hydraulic fluid from flowing out of said working chamber, wherein said electric control unit is adapted such that in said holding condition of said control element a first signal is supplied to the electromagnetic control valve during a first period, which causes said control valve to be constantly energized during said first period, and in a subsequent, second period a second signal is supplied to said electromagnetic control valve, which causes said control valve to be intermittently energized and not energized, whereby said load executes a downward movement under the influence of gravity in a stepwise manner during said second period.

2. A hydraulic operating system according to claim 1, wherein said valve element with non-return function is a non-return valve, which is placed in said fluid line between said pump and said electromagnetically operated control valve.

3. A hydraulic operating system according to claim 1, wherein said cylinder is connected to a part of a foldable roof of a vehicle.

* * * * *